(12) United States Patent
McGoldrick et al.

(10) Patent No.: US 9,278,649 B2
(45) Date of Patent: Mar. 8, 2016

(54) PORTABLE VEHICLE SAFE

(71) Applicants: George P. McGoldrick, Batavia, IL (US); Ira Katz, Buffalo Grove, IL (US); Scott A. Payne, Lombard, IL (US)

(72) Inventors: George P. McGoldrick, Batavia, IL (US); Ira Katz, Buffalo Grove, IL (US); Scott A. Payne, Lombard, IL (US)

( * ) Notice: Subject to any disclaimer, the term of this patent is extended or adjusted under 35 U.S.C. 154(b) by 14 days.

(21) Appl. No.: 14/289,154

(22) Filed: May 28, 2014

(65) Prior Publication Data

US 2015/0343958 A1    Dec. 3, 2015

(51) Int. Cl.
*B60R 7/00* (2006.01)
*B60R 7/14* (2006.01)
*E05G 1/00* (2006.01)
*E05G 1/026* (2006.01)
*E05G 1/04* (2006.01)
*B60R 7/08* (2006.01)

(52) U.S. Cl.
CPC . *B60R 7/14* (2013.01); *B60R 7/087* (2013.01); *E05G 1/005* (2013.01); *E05G 1/026* (2013.01); *E05G 1/04* (2013.01); *Y10T 29/49819* (2015.01); *Y10T 29/49828* (2015.01)

(58) Field of Classification Search
CPC ............. B60R 7/14; E05G 1/026; E05G 1/04; E05G 1/005; Y10T 29/49819; Y10T 29/49828
USPC .................. 296/37.1, 187.05, 37.8, 37.15
See application file for complete search history.

(56) References Cited

U.S. PATENT DOCUMENTS

| 5,056,342 | A  | * | 10/1991 | Prinz ................................. | 70/63 |
| 6,405,861 | B1 | * | 6/2002  | Siler et al. ..................... | 206/317 |
| 7,143,913 | B2 | * | 12/2006 | Lindsey et al. ............... | 224/413 |
| 8,020,416 | B2 | * | 9/2011  | Talmage et al. .................. | 70/85 |

* cited by examiner

*Primary Examiner* — Joseph D Pape
*Assistant Examiner* — Dana Ivey
(74) *Attorney, Agent, or Firm* — Patti & Malvone Law Group, LLC

(57) ABSTRACT

A portable vehicle safe and method for installing the safe in a vehicle is disclosed. The save can be mounted in a vehicle in any orientation while still providing convenient access to the contents. A generally rectangular body of the safe features a door that is mounted at an angle so that the safe can be mounted both vertically and horizontally. In particular, the vehicle safe can be mounted in a concealed location, for example, under a seat or in a console or glove box of a vehicle while still allowing easy and discreet access from inside the vehicle. Although the invention is shown and described in connection with storing a firearm, the vehicle safe can be used to store any desired item or items.

13 Claims, 5 Drawing Sheets

PORTABLE VEHICLE SAFE

FIELD OF THE INVENTION

The invention relates generally to vehicle safes and more particularly to a gun safe that is portable and can be flexibly mounted in a vehicle.

BACKGROUND

Recent and ongoing changes to concealed carry laws have created situations where persons carrying a firearm are not able to bring it with them when visiting certain establishments, for example, schools and restaurants. In this situation, they must be able to leave the firearm in a vehicle while safely secured. In addition, firearm owners occasionally travel from their home to another location via an airplane. The Transportation Security Administration (TSA) has implemented rules for transporting firearms in luggage that require unloaded firearms to be placed in a locked, hard-sided container as checked baggage. Certain types of ammunition may be carried in the same hard-sided case as the firearm as long as the ammunition is securely packed in containers designed to carry small amounts of ammunition.

Current methods of locking firearms in a vehicle are limited to devices that severely restrict accessibility of the locked firearm in the transportation vehicle. They are bulky and can only be mounted in certain vehicles that have a large enough space to both mount the safe and open the door to access the contents, which is typically not concealed unless it is placed in the trunk. Installing a gun safe that is visible to someone outside the vehicle provides an incentive to break into the vehicle. Unfortunately, it is seldom possible to install existing gun safes in a concealed location, for example, under a seat, because the doors open in a way that makes such an installation impossible. Due to size and accessibility issues, prior art gun safes also cannot be mounted in a concealed way unless they are in a trunk of a vehicle. However, leaving a vehicle to lock a firearm up in a trunk can potentially reveal to anyone who may be watching that a firearm will be left in an untended vehicle, increasing chances for theft.

Thus, a need exists for a vehicle safe that can be flexibly mounted in a concealed location within the passenger area of a wide variety of vehicles. There is a further need for a vehicle safe that can be concealed under a seat or in a console of a vehicle while still providing convenient and discrete access to the contents of the safe without revealing the presence of the firearm to persons outside the vehicle.

SUMMARY

The invention in one implementation encompasses a vehicle safe that can be mounted in the passenger compartment of a vehicle in any orientation while still providing convenient access to the contents of the safe. A generally rectangular body of the safe features a door that is mounted at an angle so that the safe can be mounted both vertically and horizontally. In particular, the vehicle safe can be mounted in a concealed location, for example, under a seat or in a console or glove box of a vehicle while still allowing easy and discreet access from inside the vehicle. Although the invention is shown and described in connection with storing a firearm, the vehicle safe can be used to store any desired item or items.

In an embodiment, the invention is a a portable vehicle safe having a rectangular body having a length and width substantially greater than its height, a first surface of said body and a second surface of said body opposite each other and having the same width and different lengths, the second surface length greater than the first surface length, said body having one or more mounting holes; a door having a first edge hinged to said rectangular body along a width of the second surface and a second edge contacting a width of the first surface wherein said door, when in a closed position, forms and angle with the second surface of between 25° and 75°; locking mechanism for securing the door to the rectangular body; and a mounting mechanism for flexibly and securely attaching the main body to an integral part of a vehicle.

In another embodiment, the invention is a portable vehicle safe for securely storing a firearm having a rectangular body having a length and width substantially greater than its height, a first surface of said body and a second surface of said body opposite each other and having the same width and different lengths, the second surface length greater than the first surface length, said body having one or more mounting holes; a door having a first edge hinged to said rectangular body along a width of the second surface and a second edge contacting a width of the first surface wherein said door, when in a closed position, forms and angle with the second surface of between 25° and 75°; locking mechanism for securing the door to the rectangular body; and flexible steel cable securely attaching the main body to an integral part of a vehicle in a concealed location within the passenger compartment, said flexible steel cable passing through a hole in said body and ending in a quick-release cable connection.

In a further embodiment, the invention is a method for easily installing a portable safe in a vehicle, said method having the steps of installing the portable safe in a concealed location within a passenger compartment of a vehicle, said portable safe further having a rectangular body having a length and width substantially greater than its height, a first surface of said body and a second surface of said body opposite each other and having the same width and different lengths, the second surface length greater than the first surface length, said body having one or more mounting holes; a door having a first edge hinged to said rectangular body along a width of the second surface and a second edge contacting a width of the first surface wherein said door, when in a closed position, forms and angle with the second surface of between 25° and 75°; and locking mechanism for securing the door to the rectangular body; said method having additional steps of installing one end of a tamper-proof cable around an integral portion of said vehicle in the proximity of the safe and inserting the other end of the tamper-proof cable through one or more mounting holes in the safe and securing it with a quick-release cable connection.

DESCRIPTION OF THE DRAWINGS

Features of example implementations of the invention will become apparent from the description, the claims, and the accompanying drawings in which:

DETAILED DESCRIPTION

This invention relates to vehicle safes in general and an apparatus for safely securing a firearm in particular. With the increasing enactment of concealed carry laws, there is a need for secure storage of a firearm in a vehicle when the firearm owner is visiting a facility that does not allow firearms, for example, a school or restaurant. Current vehicle safes are large and bulky and can only be mounted in a few exposed areas in vehicles that are large enough to accommodate them, or in a trunk of a vehicle. In particular, current vehicle safes cannot be mounted in a concealed location in the passenger compartment of a vehicle, for example, under the seat or in a console or glove box. A vehicle safe in the trunk is not considered a concealed location since the firearm is visible when the owner exits the vehicle to place the firearm in the safe.

Another need for secure firearm storage has to do with airplanes. New laws regarding the Federal Flight Deck Officers (FFDO) program allow pilots and other cockpit personnel to carry firearms on an airplane. However, these regulations only allow the pilots to carry a firearm on the plane itself, not in the airport. Thus, FFDOs need a way to either secure a firearm in the cockpit when they are away from the plane, or to transport it through the airport when traveling to and from the plane. Due to FAA laws, there is a further need for a safe that can be attached in a cockpit securely, but in a non-permanent way.

The inventive vehicle safe can be universally mounted in many different locations in a wide variety of vehicles. The angled door of the vehicle safe allows both vertical and horizontal mounting, as well as any other orientation, while maintaining convenient access to the contents of the safe.

If used and unless otherwise stated, the terms "upper," "lower," "front," "back," "over," "under," and similar such terms are not to be construed as limiting the invention to a particular orientation. Instead, these terms are used only on a relative basis.

Figure 1A:
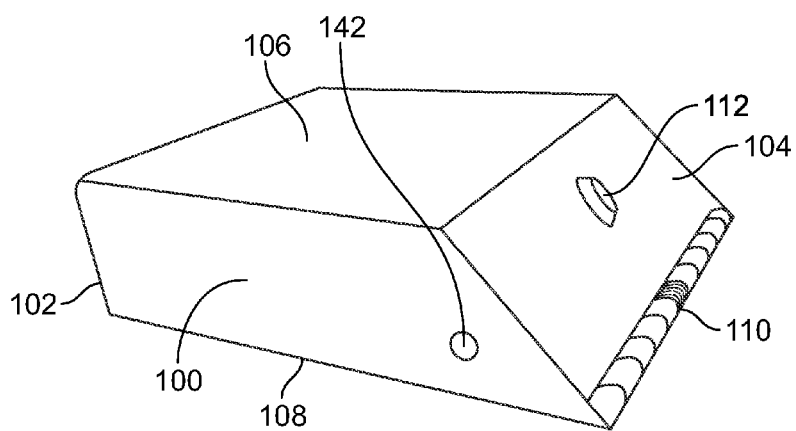
FIG. 1A depicts a perspective view of a vehicle safe with closed door.

Turning to FIG. 1A, a vehicle safe 100 in one embodiment has a body 102 and a door 104. Body 102 is rectangular in shape, having a length and width that are substantially greater than the height of the body. The length of upper surface 106 is somewhat shorter than that of lower surface 108. Thus, when closed, door 104 is at an angle. In an embodiment, the angle between door 104 and lower surface 108 is between 25° and 75°. This allows for a truly universal installation and provides convenient access to the contents of safe 100 whether it is mounted vertically, horizontally or in any other orientation. Door 104 is flush mounted and recessed inside body 102 to minimize tampering. Further security is provided by multi-point latch 112 described in more detail in connection with FIG. 2.

In an embodiment, safe 100 has a width of approximately 5.5 to 7.5 inches, an upper surface length of approximately 5.5 to 7.5 inches, a lower surface length of approximately 7 to 9 inches and a height of approximately 1.5 to 3.5 inches. Although dimensions within approximately 1"-2" of these dimensions provide the most universality, one of ordinary skill in the art would recognize that other dimensions could be used depending on the desired installation and end use of safe 100.

Figure 1B:
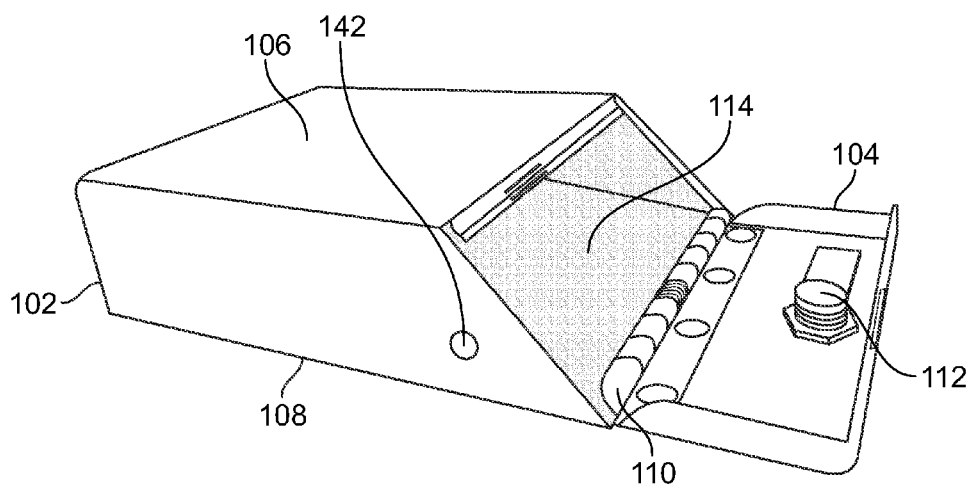
FIG. 1B depicts the vehicle safe of FIG. 1A with an open door.

FIG. 1B depicts safe 100 of FIG. 1A with door 104 in an open position. In FIG. 1B, hinge 110 is shown attaching door 104 to body 102. In an embodiment, hinge 110 is spring loaded to ease opening the safe when used in a tight location. A lining material 114, for example, auto/marine grade polyester carpet or closed cell foam, is provided inside vehicle safe 100 to protect items stored inside.

Figure 2:
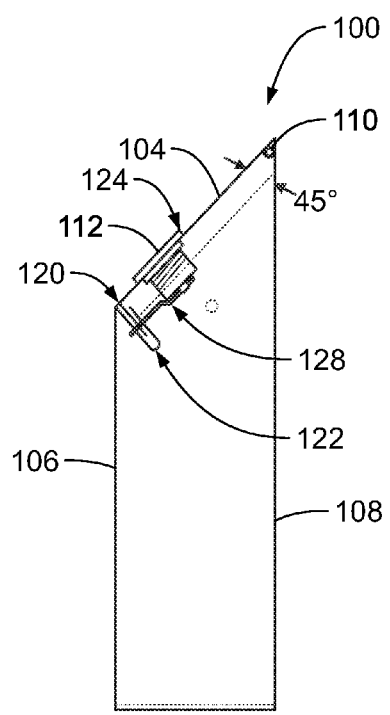
FIG. 2 depicts a side view of the vehicle safe of FIG. 1A.

A side view of safe 100 is shown in FIG. 2. Door 104 is attached to lower surface 108 by hinge 110. Door 104 is flush mounted inside body 102 and includes an extended edge 120 extending perpendicularly from the entire length of the edge of door 104 opposite hinge 110. Upper surface 106 includes a receiving pocket 122 integrally formed from upper surface 106 and extending into body 102. Pocket 122 receives extended edge 120 to provide multi-point latching. Locking mechanism 112 includes face 124 on the outside of door 104 for receiving a key. Inside safe 102, locking mechanism 112 extends inward from face 124 and attaches to locking arm 128. Turning a key in face 124 results in turning locking arm 128 so that it engages with slots 126 (shown in FIG. 1B) in extended edge 120 and both sides of receiving pocket 122 resulting in multiple securing points.

Although locking mechanism 112 has been shown in an embodiment using a key, a biometric, keypad of any other type of lock could be used.

Figure 3:
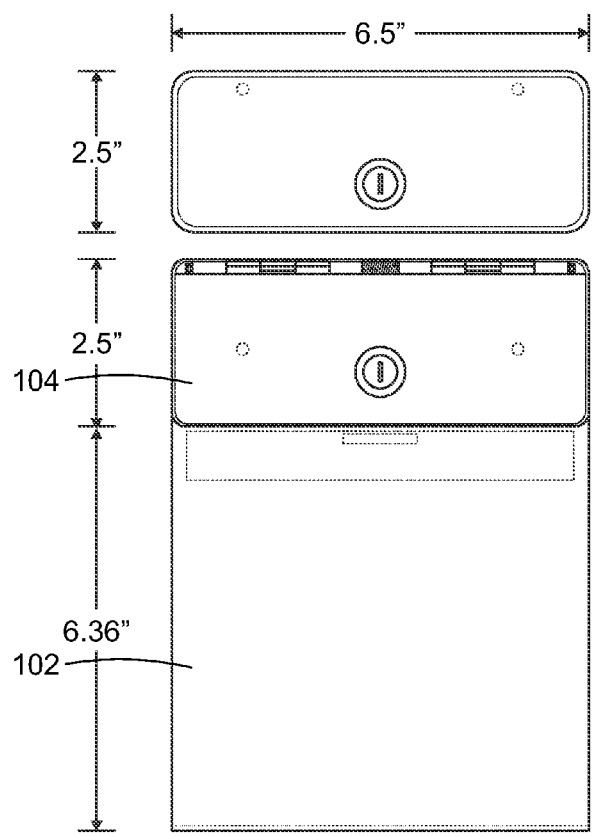
FIG. 3 depicts a top and front view of the vehicle safe of FIG. 1A.

A top and front view of vehicle safe 100 is shown in FIG. 3. In an embodiment, the corners of door 104 and lengthwise edges of body 102 are rounded with up to a 0.5" radius.

Figure 4A:
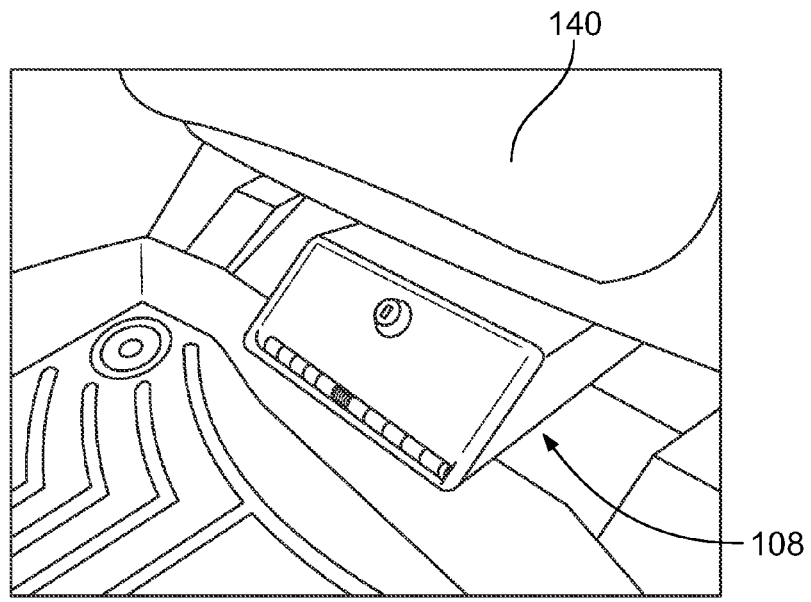
FIG. 4A depicts the vehicle safe of FIG. 1A installed under the seat of a vehicle with the door closed.
Figure 4B:
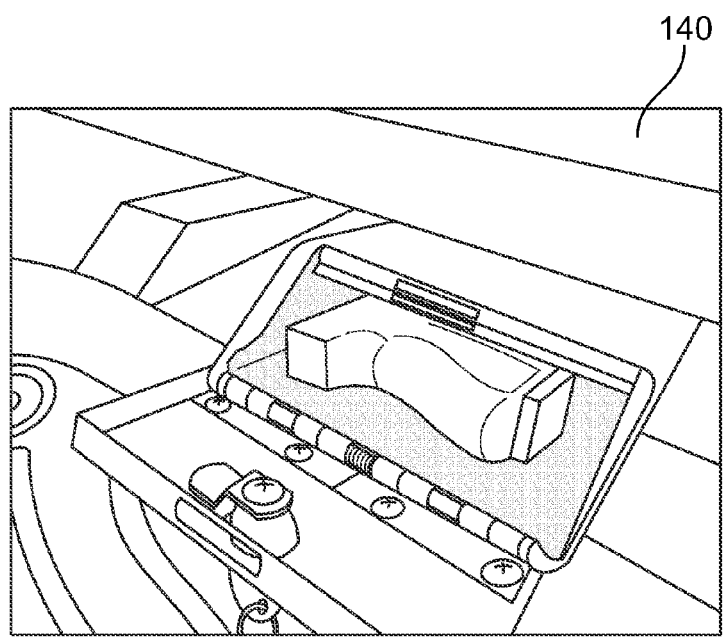
FIG. 4B depicts the vehicle safe of FIG. 1A installed under the seat of a vehicle with the door open.

FIG. 4A depicts a safe 100 installed under the seat 140 of a vehicle. Safe 100 has one or more integrated mounting holes and optional mounting brackets (not shown). In an alternative embodiment, safe 100 is installed using hook and loop tape, for example, Velcro®. Angled door 104 provides convenient access to the contents of safe 100 as shown in FIG. 4B, which depicts safe 100 of FIG. 4A with door 104 in the open position. The use of an angled door 104 instead of a door that is perpendicular to the sides of safe 100 allows a person sitting in seat 140 to conveniently and discreetly access safe 100 while still in the vehicle.

Figure 5:
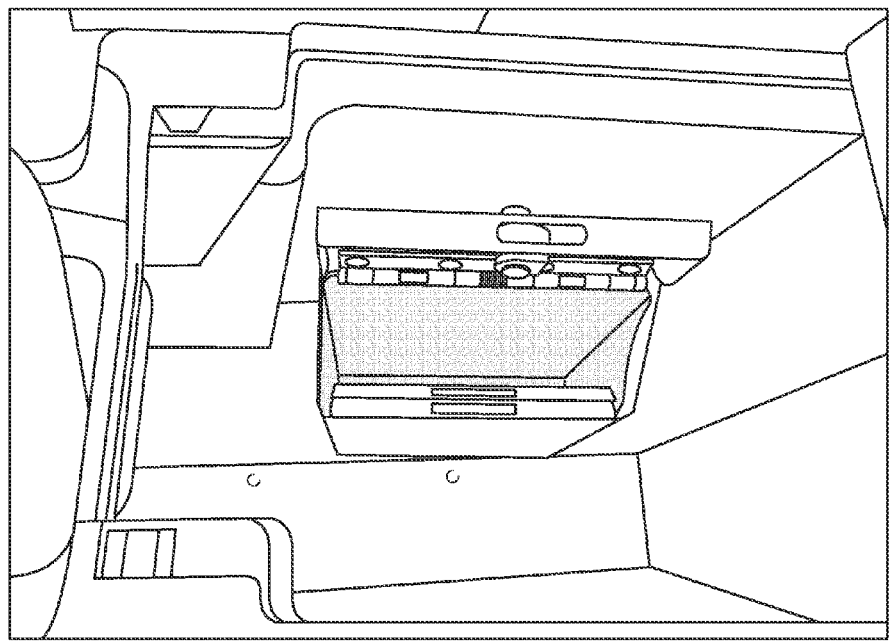
FIG. 5 depicts the vehicle safe of FIG. 1A with the door open installed in a console of a vehicle.
Figure 6B:
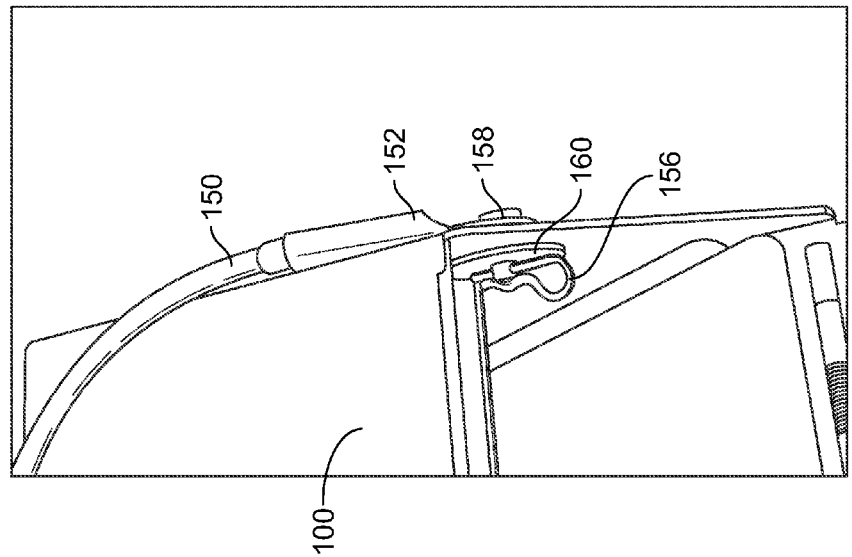
Figure 6A:
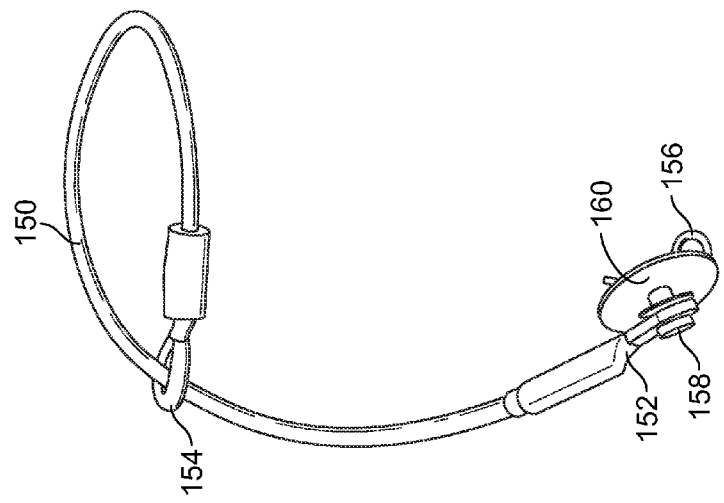

In an alternative embodiment, FIG. 5 shows vehicle safe 100 installed in a console of a vehicle. Similarly to the under seat installation of FIGS. 4A and 4B, the use of an angled door allows convenient access to the contents of safe 100. In any of the installations of FIGS. 4A, 4B and 5, safe 100 has integrated mounting holes 142 (shown in FIGS. 1A and 1B). Although shown in one side of safe 100, mounting holes can be located in any location of body 102 to allow for flexible installation in a vehicle. Safe 100 can be secured with a variety of suitable fastening devices, for example, brackets, either alone or in combination with a tamper proof steel cable. If used, a steel cable would attach to vehicle seat frame or any other permanent fixture of the vehicle, pass through one or more of the mounting holes in the safe then end with a quick release cable connection. The use of a steel cable allows easy installation of vehicle safe by a firearm owner without requiring professional installation. In addition, use of a steel cable with a quick-release cable connection allows the firearm owner to easily remove safe 100 from the vehicle and use it to securely transport the contents to a home or another mode of transportation, for example, an airplane.

Vehicle safe 100 can be provided with a handle (not shown) for convenient transportation when the safe is removed from a vehicle. As an alternative, case made of, for example, neoprene, is used hold and carry safe 100 when it is been used outside of a vehicle.

Numerous alternative implementations of the present invention exist. For example, the dimensions provided above are just an example of a particular embodiment. The specific measurements used for the vehicle safe could be varied according to various factors as would be understood by one of ordinary skill in the art. The lining inside the box could be molded to fit a specific firearm. A variety of handles and carry case options could be used, as well as various high security locking devices.

The safe 100 in one example comprises any (e.g., horizontal, oblique, or vertical) orientation, with the description and figures herein illustrating one example orientation of the safe 100, for explanatory purposes.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A portable vehicle safe for securely storing a firearm, comprising:
    a rectangular body having a length and width substantially greater than its height, a first surface of said rectangular body and a second surface of said rectangular body opposite each other and having the same width and different lengths, the second surface length greater than the first surface length, said first surface further comprising a receiving pocket extending into the rectangular body, said rectangular body further comprising one or more mounting holes;
    a door having a first edge hinged to said rectangular body along a width of the second surface and a second edge engaging said receiving pocket and wherein said door, when in a closed position, forms an angle with the second surface of between 25° and 75°;
    locking mechanism for securing the door to the rectangular body; and
    flexible steel cable for wrapping around an integral part of a vehicle in a concealed location within a passenger compartment, of the vehicle, said flexible steel cable passing through the one or more mounting holes in said rectangular body and ending in a quick-release cable connection inside the rectangular body.

2. The portable vehicle safe of claim 1 wherein the mounting mechanism further comprises an under seat mounting bracket.

3. The portable vehicle safe of claim 1 wherein the mounting mechanism further comprises a console mounting bracket.

4. The portable vehicle safe of claim 1 further comprising a handle attached to the outside of the body.

5. The portable vehicle safe of claim 1 further comprising a case for holding said main body, said case approved for gun storage in luggage during flight.

6. The portable vehicle safe of claim 1 wherein the first surface length of the rectangular body is between 5.5 and 7.5 inches, the second surface length is between 7 and 9 inches, the width is between 5.5 and 7.5 inches and the height is between 1.5 and 3.5 inches.

7. The portable vehicle safe of claim 1 wherein the door is flush mounted to the body with a spring-loaded hinge.

8. The portable vehicle safe of claim 1 wherein the locking mechanism is a multi-point latch.

9. A method for easily installing a portable safe in a vehicle, said method comprising the steps of:
    installing the portable safe in a concealed location within a passenger compartment of a vehicle, said portable safe further comprising:
        a rectangular body having a length and width substantially greater than its height, a first surface of said rectangular body and a second surface of said rectangular body opposite each other and having the same width and different lengths, the second surface length greater than the first surface length, said first surface further comprising a receiving pocket extending into the rectangular body, said rectangular body further comprising one or more mounting holes;
        a door having a first edge hinged to said rectangular body along a width of the second surface and a second edge engaging said receiving pocket and wherein said door, when in a closed position, forms an angle with the second surface of between 25° and 75° ; and
        locking mechanism for securing the door to the rectangular body;
    wrapping a first end of a tamper-proof cable around an integral portion of said vehicle in the proximity of the safe;
    passing the first end through a loop in the second end of the tamper-proof cable; and
    inserting the first end of the tamper-proof cable through the one or more mounting holes and securing it with a quick-release cable connection inside the rectangular body.

10. The method of claim 9 wherein the concealed location is under a seat of the vehicle.

11. The method of claim 9 wherein the concealed location is in a console of the vehicle.

12. The method of claim 9 further comprising the steps of:
    releasing the quick-release cable connection;
    removing the safe and its contents from the vehicle; and
    transporting the safe through a location where firearms are prohibited.

13. The method of claim 12 wherein said safe further comprises a case for holding said rectangular body, said case approved for gun storage in luggage during flight.

* * * * *